(12) United States Patent
Redman et al.

(10) Patent No.: US 10,504,203 B2
(45) Date of Patent: Dec. 10, 2019

(54) VIRTUAL GRAPHICS DEVICE DRIVER

(71) Applicant: Apple Inc., Cupertino, CA (US)

(72) Inventors: David J. Redman, Fremont, CA (US); Changki Min, San Jose, CA (US); Phillip J. Churchill, Hubbardston, MA (US); Adrian T. Sheppard, San Jose, CA (US); David A. Leech, Union City, CA (US); Unmesh Sahasrabuddhe, Palo Alto, CA (US); Ian Hendry, San Jose, CA (US); Eve Brasfield, San Joe, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/150,060

(22) Filed: May 9, 2016

(65) Prior Publication Data
US 2016/0328818 A1    Nov. 10, 2016

Related U.S. Application Data

(63) Continuation of application No. 12/492,008, filed on Jun. 25, 2009, now Pat. No. 9,336,028.

(51) Int. Cl.
*G09G 5/36* (2006.01)
*G06T 1/20* (2006.01)
(Continued)

(52) U.S. Cl.
CPC .............. *G06T 1/20* (2013.01); *G06F 9/4411* (2013.01); *G06F 9/45533* (2013.01);
(Continued)

(58) Field of Classification Search
CPC .. G06T 1/20; G06T 1/60; G09G 5/363; G06F 9/4411; G06F 9/45533; G06F 9/45558;
(Continued)

(56) References Cited

U.S. PATENT DOCUMENTS

| 5,459,825 A | 10/1995 | Anderson et al. |
| 5,682,529 A | 10/1997 | Hendry et al. |

(Continued)

FOREIGN PATENT DOCUMENTS

| EP | 16677190 | 7/2006 |
| TW | 200834464 | 8/2008 |

(Continued)

OTHER PUBLICATIONS

Gupta, et al.; "GViM: GPU-accelerated Virtual Machines," Proceedings of the 3rd ACM Workshop on System-Level Virtualization for High Performance Computing, HPCVIRT'09, 2009, pp. 17-14.

(Continued)

*Primary Examiner* — Jacinta M Crawford
(74) *Attorney, Agent, or Firm* — Fletcher Yoder PC

(57) ABSTRACT

Systems and methods are disclosed to enable switching of graphics processing unit (GPU) resources based on different factors. Embodiments include a virtual graphics driver as an interface between GPU drivers and the applications or graphics framework executing on an electronic device. The virtual graphics driver may switch GPU resources from a first GPU to a second GPU by routing function calls to the first GPU or the second GPU. The switching of GPU resources may be based on power management, system events such as hot-plug events, load management, user requests, any other factor, or any combination thereof. In some embodiments, a virtual frame buffer driver is provided that interfaces with the frame buffer of the GPU and provides a virtual view of the frame buffer to manage additional system application programming interfaces (APIs) during the switch.

20 Claims, 4 Drawing Sheets

(51) Int. Cl.
  *G06F 9/455* (2018.01)
  *G06F 9/4401* (2018.01)
  *G06F 9/50* (2006.01)

(52) U.S. Cl.
  CPC ........ *G06F 9/45558* (2013.01); *G06F 9/5027* (2013.01); *G06F 2009/45579* (2013.01); *G06F 2009/45583* (2013.01)

(58) Field of Classification Search
  CPC ....... G06F 9/45583; G06F 2009/45579; G06F 2009/45583; G06F 9/5027
  USPC .......................................... 345/501, 502, 545
  See application file for complete search history.

(56) References Cited

U.S. PATENT DOCUMENTS

| | | |
|---|---|---|
| 6,282,646 B1 | 8/2001 | Hendry |
| 6,631,474 B1 | 10/2003 | Cai et al. |
| 6,928,543 B2 | 8/2005 | Hendry et al. |
| 7,330,922 B2 | 2/2008 | Paquette et al. |
| 7,380,116 B2 | 5/2008 | Hendry et al. |
| 7,382,333 B2 | 6/2008 | Chen et al. |
| 7,474,315 B1 | 1/2009 | Hendry |
| 7,525,548 B2 | 4/2009 | Azar et al. |
| 8,013,804 B2 | 9/2011 | Cromer et al. |
| 8,199,155 B2 | 6/2012 | Leroy et al. |
| 2003/0169269 A1 | 9/2003 | Sasaki et al. |
| 2005/0273591 A1 | 12/2005 | Hendry et al. |
| 2005/0278559 A1 | 12/2005 | Sutardja et al. |
| 2006/0146057 A1 | 7/2006 | Slythe |
| 2006/0232590 A1 | 10/2006 | Bakalash et al. |
| 2008/0030509 A1 | 2/2008 | Conroy et al. |
| 2008/0034238 A1 | 2/2008 | Hendry et al. |
| 2008/0117222 A1 | 5/2008 | Leroy et al. |
| 2008/0204460 A1 | 8/2008 | Marinkovic et al. |
| 2008/0301675 A1 | 12/2008 | Cromer et al. |
| 2009/0002380 A1 | 1/2009 | Langyel et al. |
| 2009/0079746 A1* | 3/2009 | Howard ................ G06F 1/3218 345/502 |
| 2009/0079751 A1 | 3/2009 | Hendry |
| 2009/0153540 A1 | 6/2009 | Blinzer et al. |

FOREIGN PATENT DOCUMENTS

| | | |
|---|---|---|
| TW | 200836029 | 9/2008 |
| WO | 2008103359 A1 | 8/2008 |

OTHER PUBLICATIONS

Chinese Application No. 201010215193.4, Office Action dated Oct. 17, 2012, 9 pages.
Moerschell, et al.: "Distributed Texture Memory in a Multi-GPU Environment", Internet Citation, Jan. 1, 2006. pp. 1-10.
European Application No. 10723871.9, Office Action dated Dec. 11, 2012, 6 pages.
Taiwan Office Action dated Mar. 21, 2013, 13 pages.
Chinese Application No. 201010215193.4, Office Action dated Jul. 3, 2013, 21 pages.
Extended European Search Report for European Patent Application No. 18215861.8 dated Feb. 20, 2019; 9 pgs.

* cited by examiner

VIRTUAL GRAPHICS DEVICE DRIVER

CROSS-REFERENCE TO RELATED APPLICATIONS

The present application is a continuation of U.S. application Ser. No. 12/492,008, entitled "Virtual Graphics Device Driver," and filed Jun. 25, 2009, now U.S. Pat. No. 9,336,028 which issued on May 10, 2016, the entirety of which is incorporated by reference herein for all purposes.

BACKGROUND

The present disclosure relates generally to graphics processing and, more specifically, to management and utilization of multiple graphics processors.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices, including computers and portable devices such as phones and media players, typically include display screens to display user interfaces, applications, video playback, video games, etc. A display of an electronic device may be driven by a specialized processor, referred to as a Graphics Processing Unit (GPU). Applications or other software may interface with the GPU via Application Programming Interfaces (APIs), programming libraries, and frameworks that may communicate with a graphics driver for the GPU.

Some electronic devices may include multiple GPUs, such as a dual GPU device, in which one or the other GPU is used to drive the display. However, in such devices, a user may have to power cycle the device, or log in and out of the device, to switch GPU resources for applications from one GPU to the other GPU. This action may be disruptive for the user and may discourage use of the GPU resource switching capability. Solutions for GPU resource switching for individual applications typically require modification of each individual application and do not provide GPU resource switching for other software.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A system and method are provided that include a virtual graphics driver that facilitates switching of GPU resources between a first GPU and a second GPU. An electronic device may include tangible machine-readable storage medium defining instructions for a virtual graphics driver. The virtual graphics driver may receive function calls and route function calls to the first GPU such that the first GPU renders graphics on a display of the electronic device. The virtual graphics driver may switch GPU resources by routing subsequent function calls to the second GPU such that the second GPU renders graphics on the display.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the invention may include an electronic device having multiple GPUs and a virtual graphics driver to provide for seamless switching between the GPUs without a user logging out of the device. The virtual graphics driver may receive function calls from applications or frameworks executing on the electronic device and may route function calls to a first GPU driver so that graphics rendering is performed solely by a first GPU. During a switch of GPU resources, the virtual graphics driver may then route incoming function calls to a second GPU driver, switching graphics rendering to the second GPU. Additionally, a virtual frame buffer driver may route accesses between a first frame buffer of the first GPU and a second frame buffer of the second GPU. During a switch, the virtual frame buffer driver may switch frame buffer access from the first frame buffer to the second frame buffer.

Figure 1:
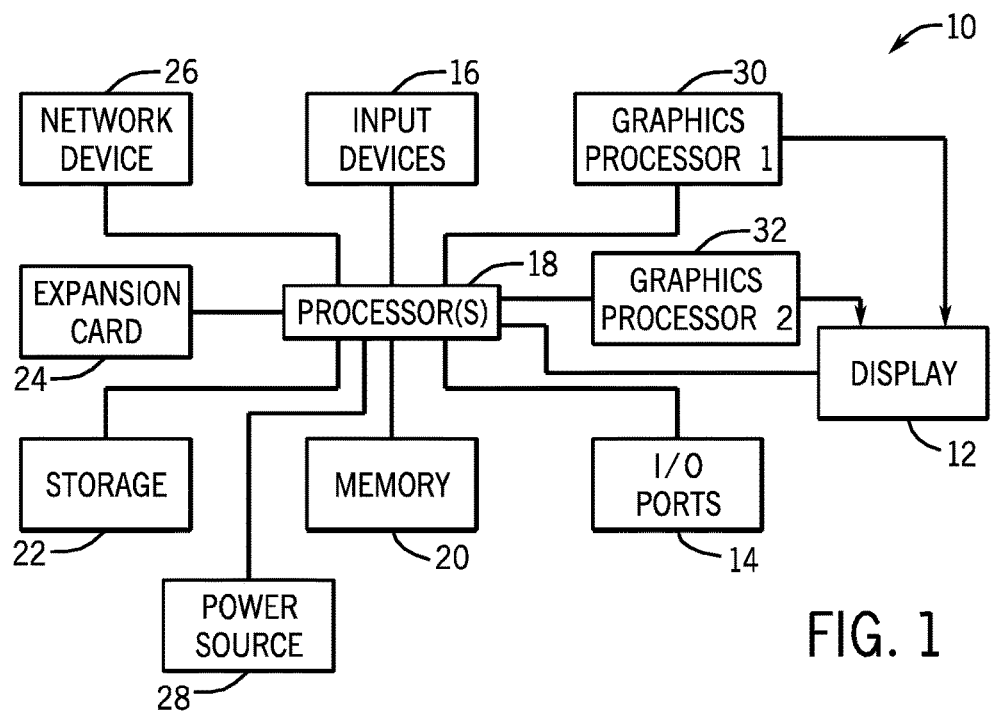
FIG. 1 is a block diagram of exemplary components of an electronic device, in accordance with an embodiment of the present invention.

An example of a suitable electronic device mentioned above may include various internal and/or external components which contribute to the function of the device. FIG. 1 is a block diagram illustrating the components that may be present in such an electronic device 10 and which may allow device 10 to function in accordance with the techniques discussed herein. Those of ordinary skill in the art will appreciate that the various functional blocks shown in FIG.

1 may include hardware elements (including circuitry), software elements (including computer code stored on a computer-readable medium) or a combination of both hardware and software elements. It should be further noted that FIG. 1 is merely one example of a particular implementation and is merely intended to illustrate the types of components that may be present in a device 10. For example, in the presently illustrated embodiment, these components may include display 12, I/O ports 14, input devices 16, one or more processors 18, memory device 20, non-volatile storage 22, expansion card(s) 24, networking device 26, power source 28, first graphics processing unit (GPU1) 30 and second graphics processing unit (GPU2) 32.

With regard to each of these components, display 12 may be used to display various images generated by device 10. In one embodiment, display 12 may be a liquid crystal display (LCD), an Organic Light Emitting Diode (OLED) display, or any suitable display. Additionally, in certain embodiments of electronic device 10, display 12 may be provided in conjunction with a touch-sensitive element, such as a touchscreen, that may be used as part of the user interface for device 10.

I/O ports 14 may include ports configured to connect to a variety of external devices, such as a power source, headset or headphones, or other electronic devices (such as handheld devices and/or computers, printers, projectors, external displays, modems, docking stations, and so forth). I/O ports 14 may support any interface type, such as a universal serial bus (USB) port, a video port, a serial connection port, an IEEE-1394 port, an Ethernet or modem port, and external S-ATA port, and/or an AC/DC power connection port.

Input devices 16 may include the various devices, circuitry, and pathways by which user input or feedback is provided to processors 18. Such input devices 16 may be configured to control a function of device 10, applications running on device 10, and/or any interfaces or devices connected to or used by electronic device 10. For example, input devices 16 may allow a user to navigate a displayed user interface or application interface. Examples of input devices 16 may include buttons, sliders, switches, control pads, keys, knobs, scroll wheels, keyboards, mice, touchpads, and so forth.

In certain embodiments, input devices 16 and display 12 may be provided together, such as in the case of a touchscreen where a touch sensitive mechanism is provided in conjunction with display 12. In such embodiments, the user may select or interact with displayed interface elements via the touch sensitive mechanism. In this way, the displayed interface may provide interactive functionality, allowing a user to navigate the displayed interface by touching display 12.

User interaction with input devices 16, such as to interact with a user or application interface displayed on display 12, may generate electrical signals indicative of the user input. These input signals may be routed via suitable pathways, such as an input hub or bus, to processor(s) 18 for further processing.

Processor(s) 18 may provide the processing capability to execute the operating system, programs, user and application interfaces, and any other functions of electronic device 10. Processor(s) 18 may include one or more microprocessors, such as one or more "general-purpose" microprocessors, one or more special-purpose microprocessors and/or ASICS, or some combination of such processing components.

The instructions or data to be processed by processor(s) 18 may be stored in a computer-readable medium, such as memory 20. Memory 20 may be provided as a volatile memory, such as random access memory (RAM), and/or as a non-volatile memory, such as read-only memory (ROM). Memory 20 may store a variety of information and may be used for various purposes. For example, memory 20 may store firmware for electronic device 10 (such as a basic input/output instruction or operating system instructions), various programs, applications, or routines executed on electronic device 10, user interface functions, processor functions, and so forth. In addition, memory 20 may be used for buffering or caching during operation of electronic device 10.

The components may further include other forms of computer-readable media, such as non-volatile storage 22, for persistent storage of data and/or instructions. Non-volatile storage 22 may include flash memory, a hard drive, or any other optical, magnetic, and/or solid-state storage media. Non-volatile storage 22 may be used to store firmware, data files, software, wireless connection information, and any other suitable data.

The embodiment illustrated in FIG. 1 may also include one or more card or expansion slots. The card slots may be configured to receive expansion card 24 that may be used to add functionality, such as additional memory, I/O functionality, or networking capability, to electronic device 10. Expansion card 24 may connect to the device through any type of suitable connector, and may be accessed internally or external to the housing of electronic device 10. For example, in one embodiment, expansion card 24 may be a flash memory card, such as a SecureDigital (SD) card, mini- or microSD, CompactFlash card, Multimedia card (MMC), or the like.

The components depicted in FIG. 1 also include network device 26, such as a network controller or a network interface card (NIC). In one embodiment, network device 26 may be a wireless NIC providing wireless connectivity over any 802.11 standard or any other suitable wireless networking standard. Network device 26 may allow electronic device 10 to communicate over a network, such as a Local Area Network (LAN), Wide Area Network (WAN), or the Internet. Further, electronic device 10 may connect to and send or receive data with any device on the network, such as portable electronic devices, personal computers, printers, and so forth. Alternatively, in some embodiments, electronic device 10 may not include network device 26. In such an embodiment, a NIC may be added as expansion card 24 to provide similar networking capability, as described above.

Further, the components may also include power source 28. In one embodiment, power source 28 may be one or more batteries, such as a lithium-ion polymer battery or other type of suitable battery. The battery may be user-removable or may be secured within the housing of electronic device 10, and may be rechargeable. Additionally, power source 28 may include AC power, such as provided by an electrical outlet, and electronic device 10 may be connected to power source 28 via a power adapter. This power adapter may also be used to recharge one or more batteries if present.

As mentioned above, electronic device 10 may include graphics processing units 30 (GPU1) and 32 (GPU2). These graphics processors may alternately drive display 12 by rendering graphics such as a user interface, images, video, or other media to be displayed on display 12. One or both of GPUs 30 and 32 may be an integrated GPU (also referred to as on-board GPU) such that GPU 30 and/or 32 are integrated with a chipset of electronic device 10. In other embodiments, one or both of GPUs 30 and 32 may be a dedicated GPU not integrated with a chipset of the electronic device 10 and having dedicated resources such as video memory. In such an embodiment, GPUs 30 and/32 may be provided on an expansion card 24.

Each GPU 30 and/or 32 may include 2D and 3D processing capability and may include video memory (such as shared memory or GDDRx memory). Such video memory may be used as frame buffers, texture maps, array storage, or other suitable information. Additionally, each GPU 30 and/or 32 may include any number of rendering pipelines and may be programmable for specific features for 3D processing, e.g., programmable shaders. For example, each GPU 30 and/or 32 may be capable of executing instructions encoded using a 3D programming API, such as Open GL, Direct X, or any other suitable API. Additionally, in some embodiments one or both of the GPUs 30 and/or 32 may include one core, two cores, or any number of cores. In some embodiments, the GPUs 30 and/or 32 may be a GPU manufactured by Nvidia Corporation of Santa Clara, Calif., Advanced Micro Devices, Inc. of Sunnyvale, Calif., and/or Intel Corporation of Santa Clara, Calif. Further, each GPU 30 and 32 may include any number of inputs and outputs and may drive an external display in addition to or instead of display 12.

As described further below, in one embodiment GPU1 30 may have less processing power (e.g., lower clock speed, lower throughput, less pipelines, less video memory, etc.) and may use less power than GPU2 32. In comparison, GPU2 32 may have more processing power and use more power than GPU1 30. In such an embodiment, GPU1 30 may be used to reduce power usage of electronic device 10. In contrast, GPU2 32 may be used for software demanding increased processing power and/or in conditions when power usage is not a concern.

Figure 2:
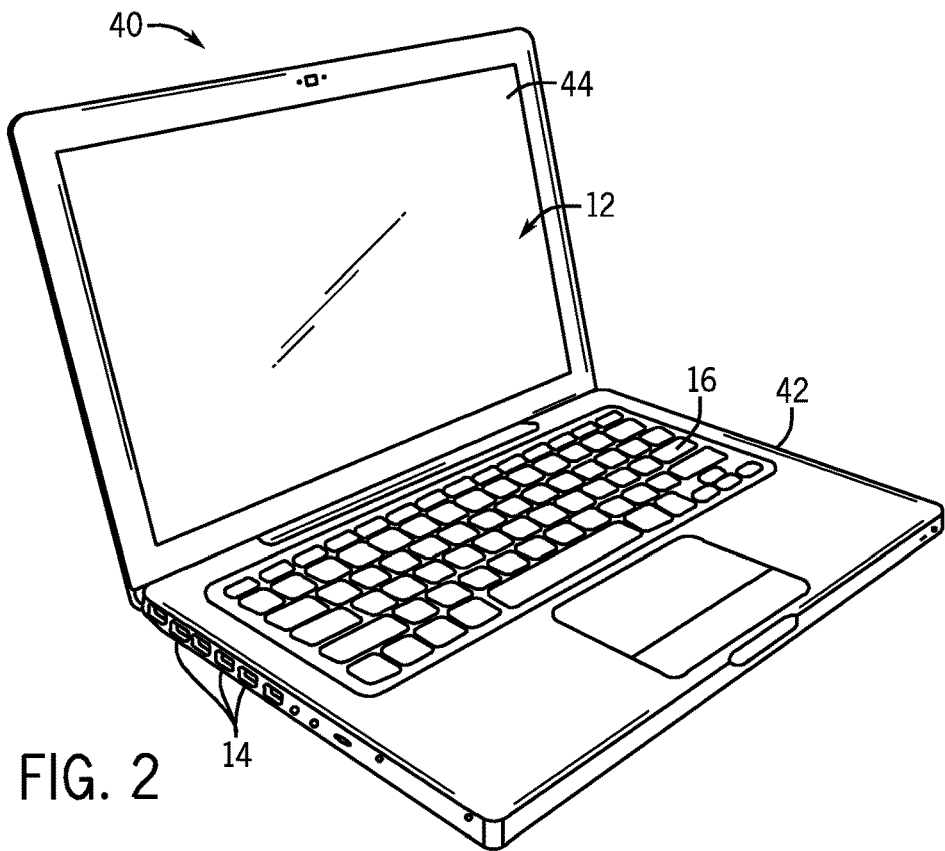
FIG. 2 is a view of a computer in accordance with an embodiment of the present invention.

Electronic device 10 may also take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, electronic device 10 in the form of a computer may be a model of a MacBook®, MacBook® Pro, MacBook Air®, iMac®, Mac® mini, or Mac Pro® available from Apple Inc. By way of example, an electronic device 10 in the form of a laptop computer 40 is illustrated in FIG. 2 in accordance with one embodiment of the present invention. The depicted computer 40 includes housing 42, display 12 (such as the depicted LCD 44), input devices 16, and input/output ports 14.

In one embodiment, input devices 16 (such as a keyboard and/or touchpad) may be used to interact with computer 40, such as to start, control, or operate a GUI or applications running on computer 40. For example, a keyboard and/or touchpad may allow a user to navigate a user interface or application interface displayed on LCD 44.

As depicted, electronic device 10 in the form of computer 40 may also include various input and output ports 14 to allow connection of additional devices. For example, computer 40 may include I/O port 14, such as a USB port or other port, suitable for connecting to another electronic device, a projector, a supplemental display, and so forth. In addition, computer 40 may include network connectivity, memory, and storage capabilities, as described with respect to FIG. 1. As a result, computer 40 may store and execute a GUI and other applications.

As described further below, in one embodiment GPU1 30 may have less processing power (e.g., lower clock speed, lower throughput, lower number of shaders, less video memory, etc.) and may use less power than GPU2 32. In such an embodiment, GPU1 30 may be used to reduce power usage of the electronic device 10 in certain circumstances, and GPU2 32 may be used for software demanding increased processing power and/or in conditions when power usage is not a concern. However, in conventional systems, switching between GPUs 30 and 32 may require the user to logout of the operating system executing on device 10 or to power cycle device 10.

Figure 3:
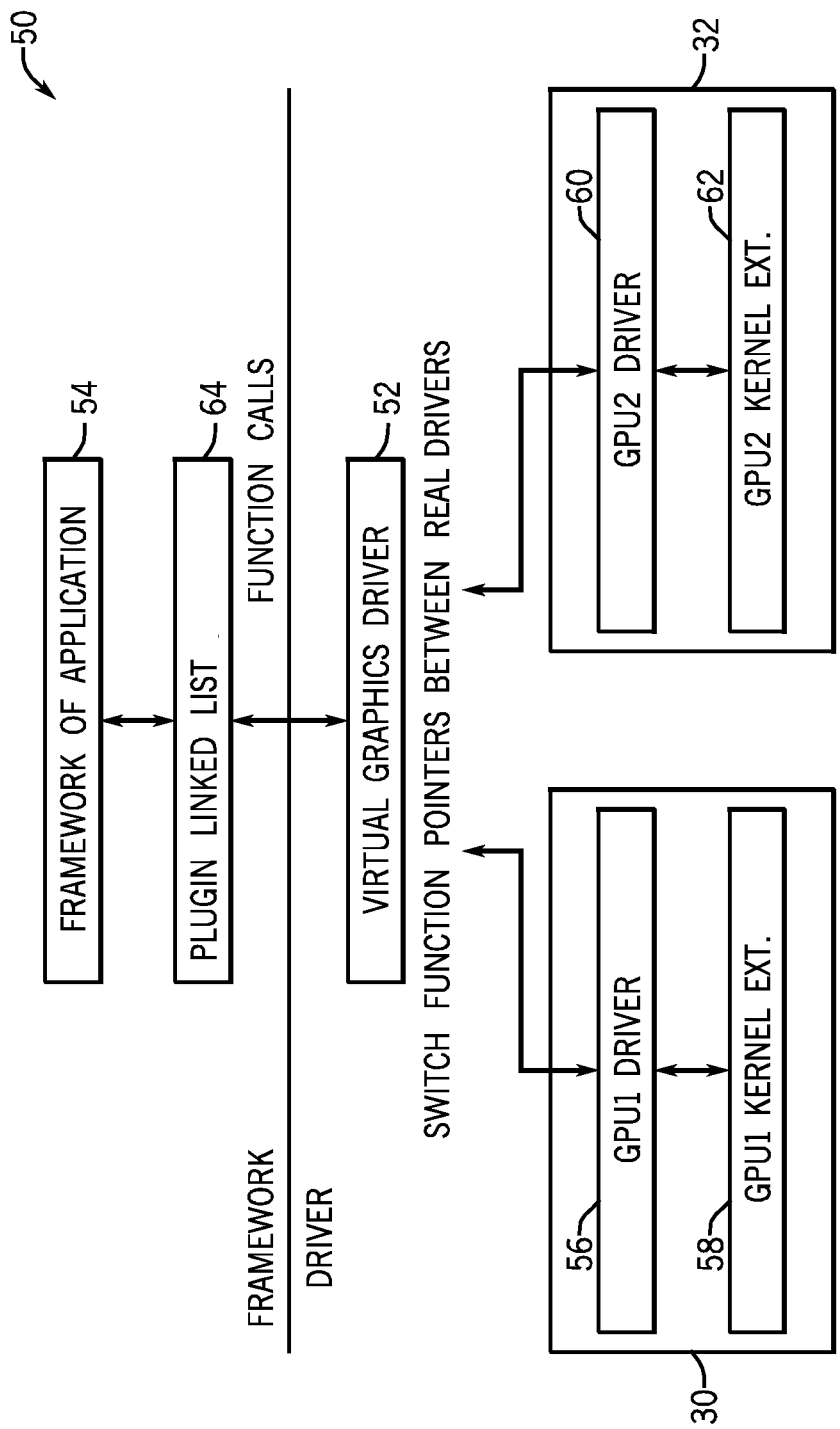
FIG. 3 is a block diagram illustrating a virtual graphics driver in accordance with an embodiment of the invention.

With the foregoing discussion in mind, FIG. 3 depicts block diagram 50 illustrating interaction between GPUs 30 and 32 and virtual graphics driver 52 in accordance with embodiments of the present invention. As described in detail below, virtual graphics driver 52 provides seamless switching between GPUs 30 and 32 by abstracting the device driver layer of the GPUs into a single virtual graphics driver 52 that switches calls from a first GPU (e.g., GPU1 30) to a second GPU (e.g., GPU2 32) and vice-versa.

Virtual graphics driver 52 is a driver layer between a graphics framework (e.g., an OpenGL framework) or application 54 and the drivers for the GPUs 30 and 32. Virtual graphics driver 52 may interpret, route, and switch function calls from the graphics framework to one of GPUs 30 and 32 by routing calls to the respective drivers. Thus, virtual graphics driver 52 provides seamless switching between GPUs 30 and 32, as graphics framework or application 54 only interfaces with virtual graphics driver 52.

As shown in FIG. 3, GPU1 30 may communicate with graphics driver 56 that receives function calls routed by virtual graphics driver 52 and communicates with the hardware of GPU1 30 to provide data back to virtual graphics driver 52 after processing by GPU1 30. Driver 56 for GPU1 30 may interface with an operating system of electronic device 10 via kernel extension 58. Similarly, GPU2 32 may communicate with graphics driver 60 that interfaces with the operating system via kernel extension 62.

The virtual graphics driver 52 becomes a member of plugin linked list 64, and the graphics framework or application 54 may send function calls (also referred to as "GLD function calls") to and receive data from virtual graphics driver 52. Virtual graphics driver 52 switches the function pointer between driver 56 and driver 60 depending on the status of the GPU resource switching.

During normal processing, e.g., no switching, virtual graphics driver 52 may route all function calls from graphics framework or application 54 to one of the GPUs, such as GPU1 30. A user or an event, such as a power management event, hot-plug event, or other event external to virtual graphics driver 52 may initiate a switch of graphics processing resources. For example, the switch may be from a low power GPU to a high power GPU or vice-versa. In response, virtual graphics driver 52 may switch current GPU resources by routing the function pointer for function calls received from graphics framework or application 54 to driver 60 for GPU2 32. For example, resources such as rendering surfaces, texture maps, shaders, etc., are routed to GPU2 32. Further, any subsequent processing, e.g., any subsequent function calls, may be routed to GPU2 32. In a similar manner, virtual graphics driver 52 may also facilitate switching from GPU2 32 to GPU1 30 by routing all function calls to driver 56. Both GPUs 30 and 32 may be active and may render output during the transition so there is no interruption or visual "glitches" during rendering and output to display 12.

Figure 4:
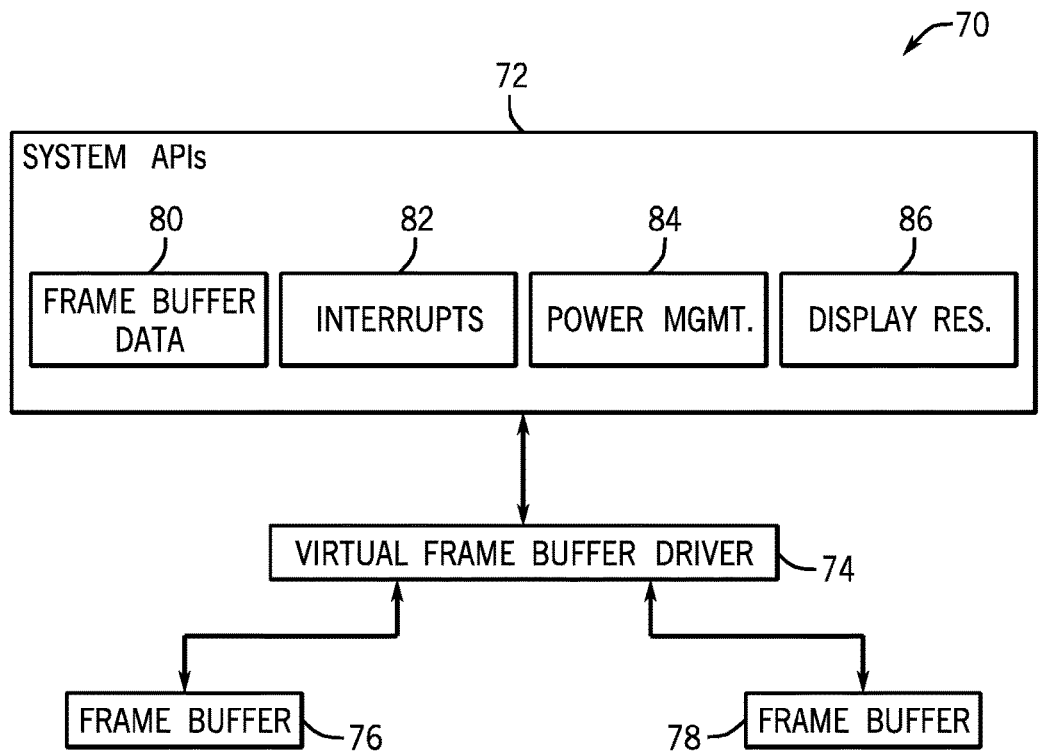
FIG. 4 is a block diagram illustrating a virtual frame buffer driver in accordance with an embodiment of the present invention.

In addition to virtual graphics driver 52, a virtual frame buffer driver may be provided to manage and switch access to the frame buffers of GPUs 30 and 32. FIG. 4 depicts block diagram 70 illustrating interaction between system APIs 72 and virtual frame buffer 74 in accordance with an embodiment of the preset invention. As shown in FIG. 4, GPU1 30 may include frame buffer 76 and GPU2 32 may include frame buffer 78. The virtual frame buffer 74 may be created from instructions stored on a tangible machine-readable storage medium that is a part of or accessible by electronic device 10 and may execute in memory 20 of device 10.

During normal (i.e., "non-switching") operation, virtual frame buffer 74 may route access to the currently active GPU, frame buffer 76 of GPU1 30. Virtual frame buffer 74 provides a virtual view of frame buffer 76 to system APIs 72 that attempt to access frame buffer 76. Thus, any access by system APIs 72 to frame buffer 76 are responded to by virtual frame buffer driver 74, abstracting the interaction between framer buffers 76 and 78 and system APIs 72.

System APIs 72 may include any number of interfaces corresponding to, for example, the actual frame buffer data (pixels) 80, interrupts 82 (e.g., for hot-plug, vertical blank), power management 84, display resolution 86, Inter-Integrated Circuit (i2C) bus, DDC/AUX activity, and/or any other API that may attempt to access frame buffers 76 and 78 of electronic device 10.

After a command to switch GPU resources, virtual frame buffer driver 74 may be switched in coordination with virtual graphics driver 52. Virtual frame buffer driver 74 may route frame buffer access by system APIs 72 to the new active GPU of the switch. For a switch to GPU2 32, as described above, virtual frame buffer driver 74 may switch access for system APIs 72 to frame buffer 78 of GPU2 32. Similarly, for a switch to GPU1 30, virtual frame buffer driver 74 may switch access by system APIs 72 to frame buffer 76 of GPU1 30.

As mentioned above, switching GPU resources may be based on a variety of factors or combinations thereof. Such "factors" may include, but are not limited to: user requests (e.g., an explicit request from a user to switch GPUs); power management (e.g., low battery, switch to battery power from AC power, switch from AC power to battery power); load management (e.g., 3D rendering for games, 3D graphics editing); thermal management (e.g., high system temperatures; high GPU1 temperature, high GPU2 temperature); and/or any other suitable factor.

Figure 5:
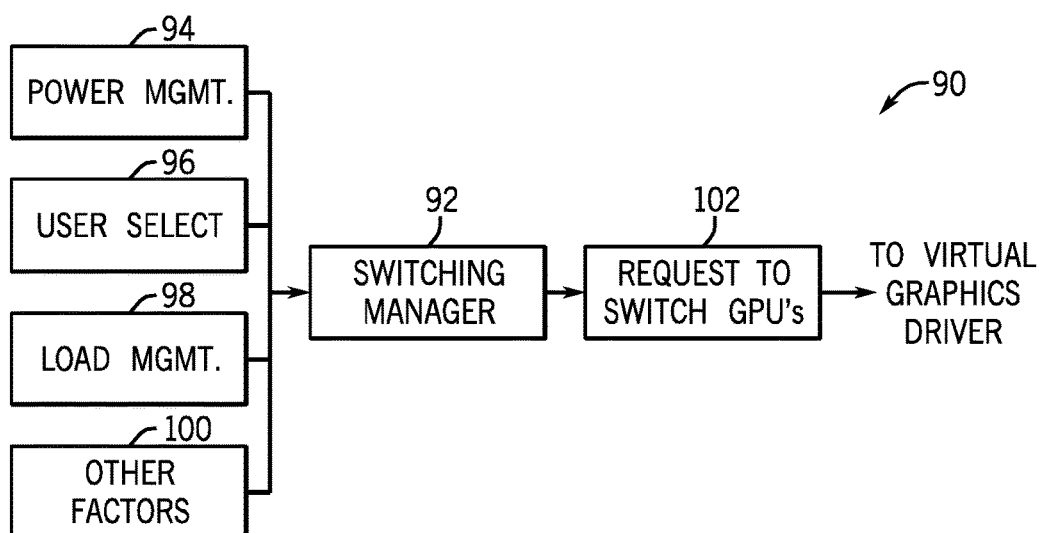
FIG. 5 is a block diagram of a switching manager in accordance with an embodiment of the present invention.

FIG. 5 depicts block diagram 90 for managing switching of GPU resources in accordance with an embodiment of the present invention. Electronic device 10 may include switching manager 92 that may evaluate one or more factors and determine whether to switch GPU resources of electronic device 10. In one embodiment, switching manager 92 may be a sequence object of the operating system of device 10. The switching manager 82 may be implemented in hardware and/or software (such instructions stored on a tangible machine-readable storage medium). As shown in FIG. 5, switching manager 92 may monitor and/or receive the factors discussed above, such as power management 94, user requests 96, load management 98, and/or any other factors 100. Based on these switching factors, switching manager 92 may send request 102 to switch GPU resources to virtual graphics driver 52, initiating virtual graphics driver 52 to provide the switching discussed above. Such a determination may be referred to as determining a "switch transition." This determination may include whether to switch GPU resources and when to switch GPU resources. In some embodiments, the determination of when to switch GPU resource may be additionally or solely performed by the virtual graphics driver 52.

Figure 6:
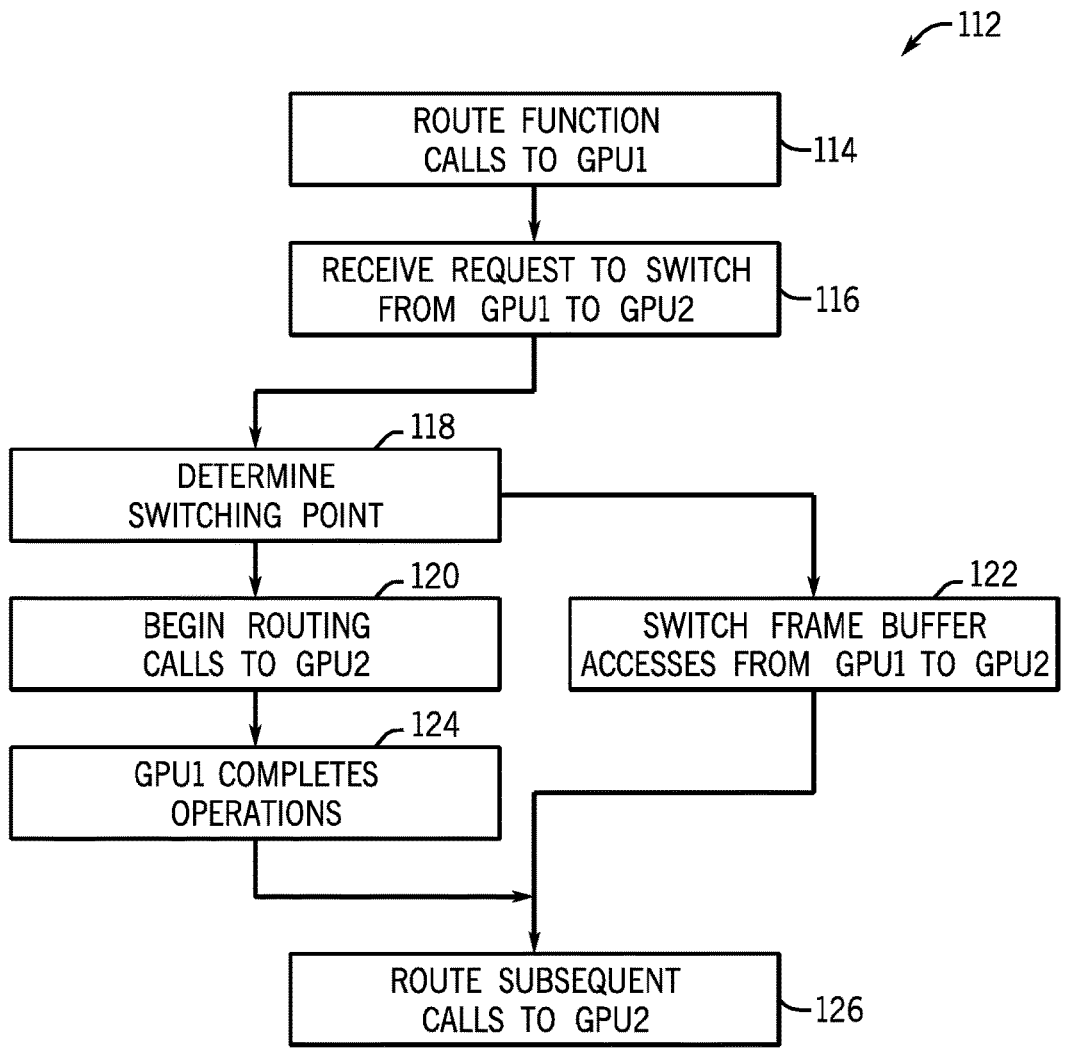
FIG. 6 is a flowchart of a process for switching GPU resources in accordance with an embodiment of the present invention.

FIG. 6 depicts process 112 for switching GPU resources from a first GPU (e.g., GPU1) to a second GPU (e.g., GPU2) in accordance with an embodiment of the present invention. Any or all steps of process 112 may be implemented as instructions stored on a tangible machine-readable storage medium that is a part of or accessible by electronic device 10. Initially, function calls received from an application or the graphics framework may be routed to GPU1 (block 112), such as during normal rendering of frames to display 12, such that GPU1 30 is solely driving display 12. After switching manager 92 determines to switch GPU resources, virtual graphics driver 52 may receive a request to switch GPU resources (block 114), e.g., from GPU1 to GPU2.

After receiving the request, virtual graphics driver 52 may determine the optimal switching point (block 118) to make the switch. This determination may be based on the execution state of the applications presently using GPU resources and the corresponding function calls received by virtual graphics driver 52. Additionally, in some embodiments, virtual graphics driver 52 may determine if GPU1 30 and/or GPU2 32 are capable of switching.

As mentioned above, during the switch transition, the virtual graphics driver 52 may begin routing function calls to the driver for GPU2 (block 120). However, GPU1 30 may still be active and any remaining operations may be completed and resulting data provided to the virtual graphics driver 52 to ensure a visually seamless transition.

Additionally, virtual graphics driver 52 coordinates with any other system resources to ensure a seamless transition. Virtual graphics driver 52 may coordinate with virtual frame buffer driver 74 to switch frame buffer access from various system APIs (block 122). After receiving a request to switch frame buffers, virtual frame buffer driver 74 may switch frame buffer access from the GPU1 frame buffer to the GPU2 frame buffer, so that subsequent accesses to the frame buffer are routed to GPU2 frame buffer. As both GPU1 30 and GPU2 32 are active during the switching transition, virtual frame buffer driver 74 may manage the frame buffer switch to also ensure a visually seamless transition and an uninterrupted output to the display 12.

After the remaining operations of GPU1 have completed (block 124), any subsequent function calls are then also routed to GPU2 driver (block 126) and the switching transition is complete. After the switch, GPU2 32 is the active GPU and is solely driving the display 12. Another embodiment of the process 112 may be executed for switching from GPU2 32 to GPU1 30, upon initiation of another request to switch GPU resources.

In addition to the GPU resource switching described above, virtual graphic driver 72 may seamlessly provide for additional functionalities and interactions with electronic device 10. In one embodiment electronic device 12 may include hot-pluggable GPUs, so that one GPU may be removed and another GPU added without interruption of operation (e.g., shutting down) of electronic device 10. In such an embodiment, virtual graphics driver 52 may switch to a first GPU to enable hot-swapping of a second GPU. After hot-swapping a third GPU into device 10, the virtual graphics driver 52 may then provide seamless switching of GPU resources of the third GPU. Additionally, in other embodiments virtual graphics driver 52 may be used to provide non-hardware drivers for a system, such as for a simulator or a transaction logging driver. Further, the GPU resource switching described above may be extended to any multi-GPU system, such as an electronic device having three GPUs, four GPUs, etc.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A system, comprising:
an electronic device comprising:
a first graphic processing unit (GPU);
a first frame buffer configured to store image data for the first GPU;
a second GPU;
a second frame buffer configured to store image data for the second GPU;
a non-transitory tangible machine-readable storage medium comprising instructions to:
receive graphics function calls by graphics driver software from a framework, wherein the graphics driver software is configured to route the graphics function calls to the first GPU or the second GPU;
route the graphics function calls for execution by the first GPU;
provide the image data to a display from the first frame buffer when the graphics function calls are routed to the first GPU, wherein the provision of the image data to the display from the first frame buffer is provided via a frame buffer application programming interface through the graphics driver software;
determine to switch the graphics function calls from the first GPU to the second GPU using the graphics driver software, wherein the graphics driver software determines when to switch the graphic function calls;
in response to the determination to switch, switch the graphics function calls to the second GPU;
route subsequent graphics function calls for execution by the second GPU; and
provide the image data to the display from the second frame buffer when the graphics function calls are routed to the second GPU, wherein the provision of the image data to the display from the second frame buffer is provided via the frame buffer application programming interface through the graphics driver software.

2. The system of claim 1, wherein the first GPU is configured execute the graphics function calls to render graphics for display on the display.

3. The system of claim 2, wherein the first GPU is configured to transmit the image data to the display.

4. The system of claim 2, wherein the second GPU is configured to execute the graphics function calls to render second graphics for display on the display.

5. The system of claim 1, wherein the first GPU comprises an integrated GPU.

6. The system of claim 1, wherein the second GPU comprises a dedicated GPU.

7. The system of claim 1, wherein switching the graphics function calls to the second GPU is based upon a type of graphic function call received.

8. The system of claim 7, wherein the type of graphics function call received corresponds to an amount of processing required to render an image.

9. The system of claim 1, wherein the graphics driver software comprises a plurality of graphics drivers.

10. A method, comprising:
routing, using graphics driver software, first function calls received from a framework to a first graphics processing unit (GPU) of an electronic device for execution of the first function calls by the first GPU;
rendering an image for display on a display of the electronic device via the first GPU by providing image data to the display from a first frame buffer when the first function calls are routed to the first GPU, wherein the provision of the image data to the display from the first frame buffer is provided via a frame buffer application programming interface through the graphics driver software;
determining, using the graphics driver software, whether to switch rendering from the first GPU to a second GPU, wherein when it is determined to switch rendering from the first GPU to the second GPU;
in response to the determination to switch and using the graphics driver software, routing second function calls received from the framework to the second GPU of the electronic device for execution of the second function calls by the second GPU, wherein the second function calls are subsequent to the first function calls; and
rendering a second image for display on the display by providing the image data to the display from a second frame buffer when the second function calls are routed to the second GPU, wherein the provision of the image data to the display from the second frame buffer is provided via the frame buffer application programming interface through the graphics driver software.

11. The method of claim 10, comprising receiving the first and the second function calls from an application executing on the electronic device.

12. The method of claim 10, wherein determining whether to switch is based on the first or the second function calls.

13. The method of claim 10, wherein determining whether to switch is based on processing power required to render the second image.

14. A non-transitory tangible machine-readable storage medium comprising instructions for:
determining to switch graphics function calls from a first graphics processing unit (GPU) to a second GPU using graphics driver software, wherein the graphics driver software determines when to switch the graphic function calls;
receiving, at the graphics driver software, a function call based at least in part on a type of function call;
routing, using the graphics driver software, the function call to a selected one of the first GPU or the second GPU for processing therein;
providing image data to a display from a first frame buffer when the graphics function calls are routed to the first GPU, wherein the provision of the image data to the display from the first frame buffer is provided via a frame buffer application programming interface through the graphics driver software; and
providing the image data to the display from a second frame buffer when the graphics function calls are routed to the second GPU, wherein the provision of the image data to the display from the second frame buffer is provided via the frame buffer application programming interface through the graphics driver software.

15. The non-transitory tangible machine-readable storage medium of claim 14, wherein the type of function call received corresponds to an amount of processing required to render an image.

16. The non-transitory tangible machine-readable storage medium of claim 14, comprising selecting the second GPU for processing of the function call when the type of the function call received is correlated with rendering of 3D images.

17. The non-transitory tangible machine-readable storage medium of claim 14, comprising selecting the second GPU for processing of the function call when the type of the function call received corresponds to rendering images for a game.

18. The non-transitory tangible machine-readable storage medium of claim 14, comprising routing the received function call to the first GPU when received function call is determined not to correspond to a particular type of function calls.

19. The non-transitory tangible machine-readable storage medium of claim 18, wherein the particular type of function calls correspond to rendering of a 3D image or an image for a game.

20. The non-transitory tangible machine-readable storage medium of claim 18, wherein the particular type of function calls correspond to Direct X encoded instructions.

* * * * *